United States Patent Office  3,714,180
Patented Jan. 30, 1973

3,714,180
SULFONYL BENZIMIDAZOLES
Rudiger D. Haugwitz, Highland Park, and Venkatachala
Lakshmi Narayanan, Hightstown, N.J., assignors to
E. R. Squibb & Sons, Inc., New York, N.Y.
No Drawing. Filed Aug. 12, 1970, Ser. No. 63,274
Int. Cl. C07d 49/38
U.S. Cl. 260—309.2     2 Claims

ABSTRACT OF THE DISCLOSURE

Sulfonyl benzimidazoles are provided which are useful as anthelmintics.

---

This invention relates to sulfonyl benzimidazoles of the structure

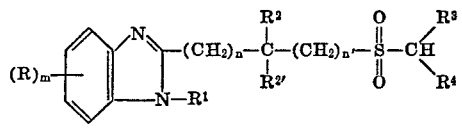

wherein R can be hydrogen, hydroxy, lower alkoxy, amino, aminoalkyl, carbamate ester (—NHCOOR$^5$), lower alkyl, nitro, thiocyanato, halo, aryl-lower alkyl, mercapto, aryl, lower alkylaryl; R$^1$, R$^2$, R$^{2'}$, R$^3$ and R$^4$ are the same or different and can be hydrogen, lower alkyl, aryl-lower alkyl aryl or substituted aryl, R$^5$ is lower alkyl, aryl or cycloalkyl, $m$ is 1 or 2, $n$ is 0 or 1, and $n'$ is 0 to 4 and $n+n'$ is 4 or less.

The lower alkyl groups represented by the symbols R, R$^1$ and R$^2$ are straight or branched chain aliphatic hydrocarbon radicals having up to seven carbon atoms, such as methyl, ethyl, propyl, isopropyl, butyl, isobutyl, t-butyl, amyl, hexyl, heptyl and the like. The lower alkyl groups represented by R$^3$ and R$^4$ are of the kind mentioned with respect to R, R$^1$ and R$^2$ except that they have from one to about five carbon atoms.

With respect to R, the lower alkoxy groups represented thereby included straight and branched chain radicals of up to seven carbon atoms, corresponding to the above R, R$^1$, R$^2$, R$^{2'}$ alkyl groups, e.g., methoxy, ethoxy, propoxy, isopropoxy, and the like. In addition, R may represent a lower alkylenedioxy group, such as methylenedioxy and ethylenedioxy. R can include each of the four halogens but chlorine and bromine are preferred. The amino groups can be substituted and include mono- or di-lower alkyl-amino wherein lower alkyl is as defined above containing from one to about seven carbon atoms, such as methylamino, ethylamino, isopropylamino, heptylamine, dimethylamino, diethylamino, methylethylamino, methylbutylamino, ethyl i-propylamino, as well as derivatives from halocarbonate esters

wherein X is bromine or chlorine and R$^5$ is as defined herebefore.

The term "aryl" includes monocyclic or bicyclic monovalent or bivalent aromatic ring systems such as phenyl or naphthyl, phenylene and naphthylene. These aryl radicals can include as substituents any of the lower alkyl groups included within the definition of R, R$^1$, R$^2$, R$^{2'}$, R$^3$ and R$^4$.

It is to be understood that where more than one R substituent is present, each R may be the same or different.

Preferred are those compounds wherein R, R$^1$, R$^{2'}$, R$^3$ and R$^4$ are hydrogen, and $n$ is 0 and $n'$ is 1.

Exemplary of compounds falling within the present invention include but are not limited to the following:

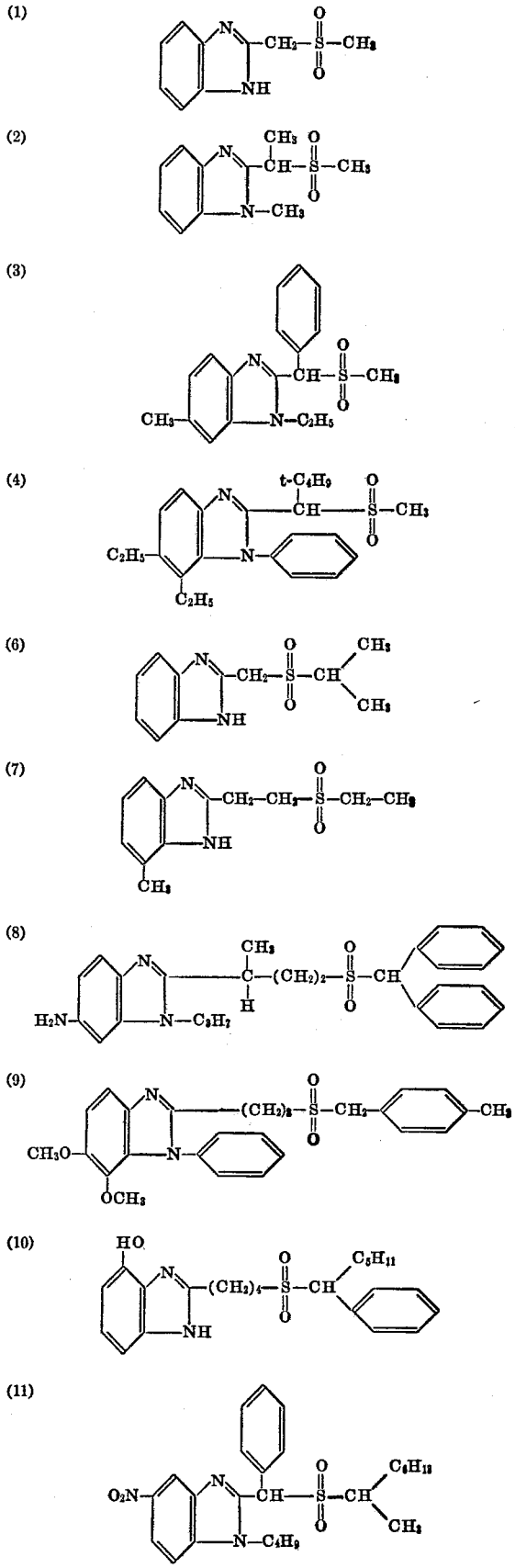

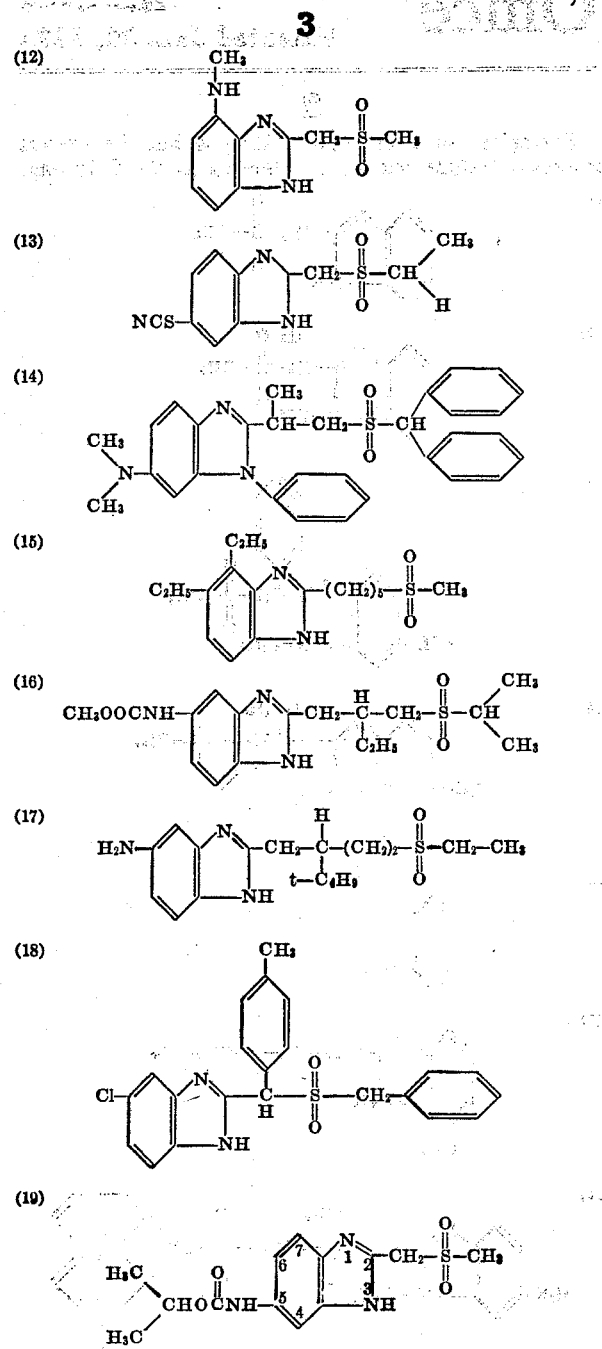

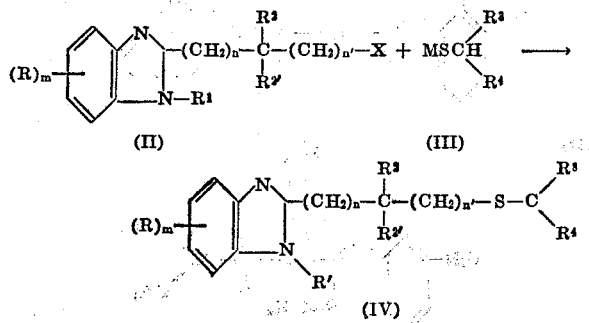

Compounds of Formula I are prepared by reacting a 2-haloalkyl-benzimidazole with a mercapto salt in a molar ratio of benzimidazole to salt of about 1:1 to about 1:10 in the presence of protic or aprotic solvents such as lower alkanols, acetone, dimethylformamide, or dimethylsulfoxide, at a temperature within the range of from about 0 to about 153° C. to form a sulfide in accordance with the following reaction wherein R, $R^1$, $R^2$, $R^{2'}$, $R^3$, $R^4$, m and n are as defined above and X is Cl, Br or I and M is an alkali metal or an alkaline earth metal, such as sodium, potassium, calcium or magnesium.

The sulfide IV is then oxidized via the sulfoxide V to the sulfone I in accordance with the following reactions:

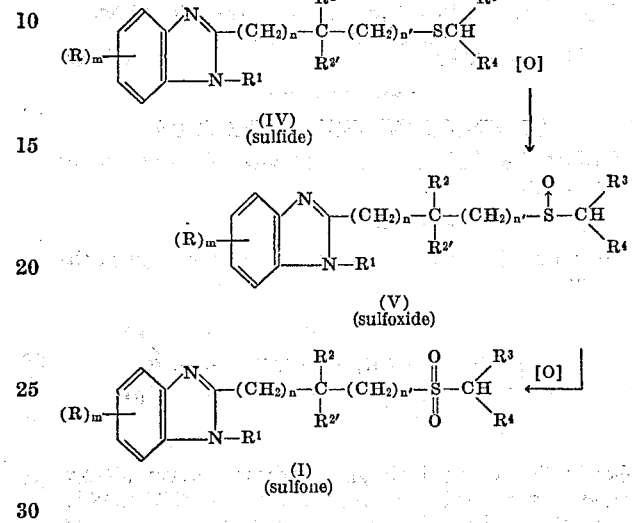

Oxidizing agents which can be employed in the above oxidations include organic and inorganic oxidizing agents such as hydrogen peroxide, m-chloro-perbenzoic acid, peracetic acid and potassium permanganate as well as any of the oxidizing agents mentioned in The Organic Chemistry of Sulfur, C. M. Suter, 658–773, J. Wiley and Sons, N.Y. (1949).

The above oxidations are carried out in the presence of a solvent; when peracids or hydrogen peroxide are employed, acetic acid, acetone or chloroform can be used; where potassium permanganate is used, dilute sulfuric acid, ethanol, carbon tetrachloride, water or benzene can be employed as a solvent.

The above oxidations can be carried out at temperatures ranging from about 0 to about 100° C. for periods ranging from about one to about twenty-four hours.

The oxidizing agent is employed in a molar ratio to the sulfide IV within the range of from about 1:1 to about 10:1 to form the sulfoxide V and subsequently the sulfone I.

Alternatively, the sulfide IV can be prepared by reacting salts of 2-mercaptoalkyl benzimidazoles (VI) and halo-derivatives VII in a molar ratio of benzimidazoles to halo derivatives of within the range of from about 1:1 to about 10:1 in the presence of protic or aprotic solvents such as described heretofore at a temperature within the range of from ambient to about 130° C. in accordance with the following reaction:

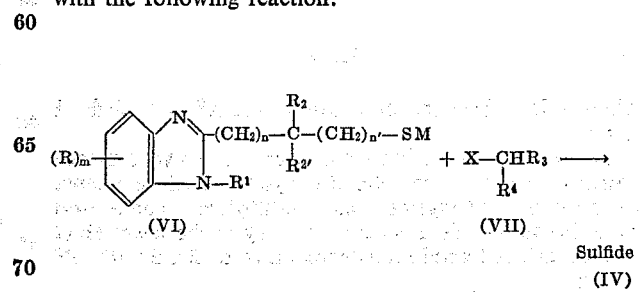

where R, $R^1$, $R^2$, $R^{2'}$, $R^3$, $R^4$, n $n^1$, m, X and M are defined previously.

The halo-alkyl benzimidazole (II) and mercaptoalkyl benzimidazole (VI) compounds are well known to the art and can be prepared by reacting an o-phenylenediamine derivative (VIII), with an haloalkanoic acid (IX) or a mercaptoalkanoic acid (X) to yield the haloalkyl benzimidazole (II) or the mercaptoalkyl benzimidazole (XI).

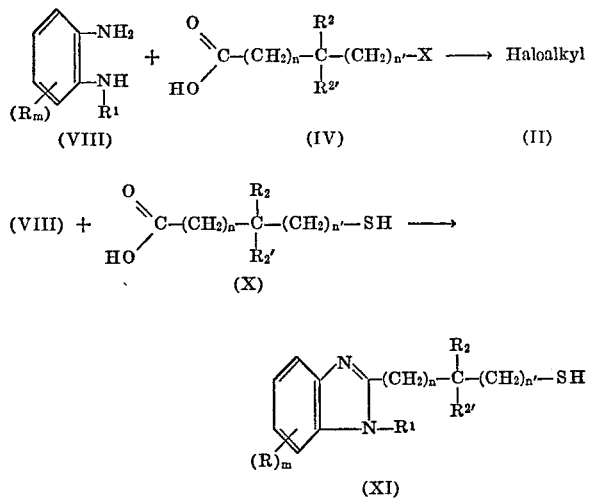

These reactions are preferably carried out in acid medium such as dilute hydrochloric acid. They follow the procedure set forth in the Journal of the Chemical Society, 1928, 2393, generally referred to as "Phillips Benzimidazole Synthesis."

Conversion of (XI) into (VI) is brought about by treating it with bases such as sodium or potassium hydroxide, sodium or potassium carbonate or metal alkoxides such as sodium methoxide.

The compounds of Formula I form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic or organic acid. Illustrative are the hydrohalides, especially the hydrochloride and hydrobromide which are preferred, sulfate, nitrate, phosphate, oxalate, tartrate, maleate, fumarate, citrate, succinate, methanesulfonate, benzenesulfonate, toluenesulfonate, and the like.

The sulfonyl benzimidazoles described herein have anthelmintic activity and are useful in the treatment and/or prevention of helminthiasis, a parasitic disease which causes widespread and often serious infection in domesticated animals such as swine, horses, cattle, sheep, and goats. In treating domesticated animals, the compounds may be mixed with a nontoxic, edible carrier to form a feed supplement which is then incorporated in the animal feed in the desired concentration, or they may be administered in unit dosage forms which, in the case of large domesticated animals, take the form of boluses, or in the form of a liquid drench. Alternatively, water-soluble salts or a dispersable, wettable powder containing the anthelmintic agent may be added to the drinking water of the animals.

The preferred dosage level for treating a helminth infection will depend to a large extent on the particular sulfonyl benzimidazole compound being employed, on the severity of the infection and on the particular species of animal to be treated. In general, the sulfonyl benzimidazoles exhibit anthelmintic activity when administered to animals in a daily dose of about 50 to about 300 mg. per kilogram of animal body weight. It is preferred to employ in the range of 100–200 mg. per kilogram of body weight per day. The compounds may be given in a single dose or divided into a plurality of smaller doses. If desired, the course of treatment may be extended over a period of days in which case the optimum daily dose level may be lowered. When the compounds are to be employed primarily as prophylactic agents for the prevention of helminthic infections, the preferred daily dose level is, of course, lower than the therapeutic level is, preferably in the range of about 10–70 mg. per kilogram of body weight. The sulfonyl benzimidazoles may be incorporated in the animal feeds, and this method of administration is preferred when the compounds are to be used prophylactically, in which case they are incorporated in the feeds at concentrations such that the animal will consume daily from about 10 to about 70 mg. of sulfonyl benzimidazole per kilogram of body weight.

The means employed for administering these benzimidazoles to animals are not critical, and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration, since this is the most effective method of treating the worm-infested stomach or intestinal tract.

When the sulfonyl benzimidazoles are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired, and the severity and type of parasitic infestation. For large animals such as sheep, swine or cattle, boluses weighing up to 15 grams may be used, although it is preferred to employ boluses weighing from 2–10 grams and containing from 1–5 grams of the anthelmintic agent. These boluses, as well as smaller size tablets, contain binders and lubricants, and are compounded by techniques known in this art. Capsules are readily prepared by mixing the active ingredient with a diluent such as starch or lactose and filling into the capsule.

In order to treat infected animals by means of a dench, the sulfonyl benzimidazoles are mixed with a suspending agent such as bentonite and the solid product added to water just prior to administration. The preferred drenches in accordance with this invention contain from about 5–50% by weight of sulfonyl benzimidazole compound.

The sulfonyl benzimidazoles described herein may also be administered as a component of the feed of the animals or dissolved or suspended in the drinking water. According to the invention, novel feed and feed supplement compositions are provided in which compounds of Formula I above are present as an active anthelmintic ingredient. Such compositions comprise the benzimidazoles intimately dispersed in or admixed with an inert carrier or diluent, i.e. one that is nonreactive with respect to the sulfonyl benzimidazole and that may be administered with safety to the animals. The carrier or diluent is preferably one that is or may be an ingredient of the animal ration.

In the feed supplement compositions the active ingredient is present in relatively large amounts. These supplements are suitable for addition to the feed either directly or after an intermediate dilution or blending step. Examples of carriers or diluents suitable for such compositions are solid orally ingestible carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 5% to about 50% by weight, and preferably from about 10–30% by weight, of active ingredient are particularly suitable for addition to feeds. The active compound is normally dispersed or mixed uniformly in the diluent but in some instances may be sorbed on the carrier.

Feed supplements are prepared by uniformly mixing the appropriate sulfonyl benzimidazole with the carrier or carriers. Such supplements are added to the finished animal feed in an amount adequate to give the final concentration desired for controlling or treating helminthiasis by way of the animal ration. Although the preferred level in feeds will depend on the patricular compound being employed, the anthelmintic compounds of this invention are normally fed at levels of 0.10–2.0% in the feed. One advantageous method of administering the compounds of this invention to animals whose feeds are conveniently pelleted, such as sheep, is to incorporate them directly in the pellets. For instance, sulfonyl benzimidazole is readily incorporated in nutritionally adequate alfalfa pellets (during the pelleting operation) at levels of 0.5 to 5 grams per pound of pellets for therapeutic use, and at lower levels for prophylactic use, and such pellets fed to the worm-infested animals. Alternatively, the sulfonyl benzimidazoles may be incorporated in salt licks or salt blocks at any desired concentration (concentrations of 5–25% by weight are conveniently employed). Large animals such as sheep, cattle and goats, then receive the anthelmintics with their salt.

The following examples further illustrate the invention.

EXAMPLE 1

2-[(methylsulfonyl)methyl]benzimidazole (A) A mixture of 20 g. of 2-mercaptomethyl-benzimidazole, 14.6 g. sodium methoxide and 8 ml. of methyl iodide, is dissolved in 1 l. of methanol and refluxed for one hour. Upon evaporation, the residue is dissolved in water and extracted with ether. On evaporation of the dried ether 2-[(methylthio)methyl]benzimidazole is obtained. Crystalliaztion from ethyl acetate yields 13 g., M.P. 151–153°.

(B) To an ice-cold, stirred solution of 5 g. of the above sulfide in 200 ml. of chloroform, there is added 12 g. of m-chloroperbenzoic acid. Upon completed addition, the mixture is stirred for ten minutes at room temperature. After this time period a white precipitate forms. This mixture is diluted with 50 ml. of water and the pH is adjusted to 8 with saturated potassium carbonate solution. The product is extracted exhaustively with chloroform and the combined extracts are washed with water until neutral. Upon evaporation of the dried solvents, the crystalline sulfone is obtained. Two crystallizations from ether yield 2.4 g. of analytically pure sulfone, M.P. 196–198°.

Calcd. for $C_9H_{10}N_2O_2S$ (percent): C, 51.42; H, 4.80; N, 13.3; S, 15.25. Found (percent): C, 51.17; H, 4.50; N, 13.15; S, 15.36.

EXAMPLE 2

2-[(ethylsulfonyl)methyl]-5-nitrobenzimidazole (A) A solution of 10 g. of 2-chloromethyl-5-nitrobenzimidazole is added to a solution of 1.25 g. sodium in 400 ml. of abs. ethanol and 3.6 ml. of ethyl mercaptan. After refluxing the mixture for two hours, the solvent is evaporated. The residue is treated with water and extracted with ether. Evaporation of the dried solvent yields 13 g. of oily 2-[(ethylthio)methyl]-5-nitrobenzimidazole.

(B) The above oil is dissolved in 250 ml. of chloroform. The solution is chilled in an ice bath and 20 g. of m-chloroperbenzoic acid is added with stirring. After 30 minutes of stirring at room temperature, 15 ml. of water is added. The pH is adjusted to 8 with saturated potassium carbonate solution and the product is extracted exhaustively with chloroform. The combined extracts are washed with water until neutral, dried and evaporated. The product is crystallized twice from acetone to yield 3.5 g., M.P. 208–210°.

Calcd. for $C_{10}H_{11}N_3O_4S$ (percent): C, 44.61; H, 4.12; N, 15.59. Found (percent): C, 44.37; H, 4.17; N, 15.71.

EXAMPLE 3

2-[(ethylsulfonyl)methyl]-5-chlorobenzimidazole (A) A solution of 8 g. of 2-chloromethyl-5-chlorobenzimidazole in 300 ml. of methanol is added to a solution of 6.4 g. of sodium carbonate and 3.6 g. of ethyl mercaptan in 600 ml. of water and refluxed for 30 minutes. Upon cooling the sulfide is extracted with ether. Evaporation of the dried extract furnishes 9 g. of oil (2-[(ethylthio)-methyl]-5-chloro-benzimidazole).

(B) 4.5 g. of the above oily sulfide is dissolved in 50 ml. of chloroform. To the stirred ice-cold solution, there is added 10.6 g. of m-chloroperbenzoic acid. After stirring the mixture for 30 minutes at room temperature, 75 ml. of water is added and the pH is adjusted to 8 with saturated potassium carbonate solution and the product is extracted with chloroform. The combined extracts are washed with water until neutral, dried and evaporated. Two crystallization from acetone-ether furnishes 1 g. of pure sulfone, M.P. 197–199°.

Calcd. for $C_{10}H_{11}ClN_2O_2S$ (percent): C, 46.46; H, 4.30; N, 10.83. Found (percent): C, 46.46; H, 4.52; N, 11.10.

EXAMPLE 4

2-[(methylsulfonyl)methyl]-5,6-dimethylbenzimidazole

Utilizing the procedure of Example 1 but substituting 5,6 - dimethyl-2-mercaptomethylbenzimidazole for 2-mercaptomethyl-benzimidazole, the above titled compound is obtained.

EXAMPLE 5

2-[(ethysulfonyl)methyl]-5-hydroxybenzimidazole

Utilizing the procedure of Example 3 but substituting 2-chloromethyl-5-hydroxybenzimidazole for 2-chloromethyl-5-chlorobenzimidazole, the product is 2-[(ethylsulfonyl)methyl]-5-hydroxybenzimidazole.

EXAMPLE 6

2-[(methylsulfonyl)methyl]-1-benzylbenzimidazole

Utilizing the procedure of Example 1 but substituting 1-benzyl-2-chloromethylbenzimidazole for 2-chloromethylbenzimidazole the product recovered is 2-[(methylsulfonyl)methyl]-1-benzylbenzimidazole.

EXAMPLE 7

2-[(propylsulfonyl)methyl-5-butylbenzimidazole

Utilizing the procedure of Example 3 but substituting 5-butyl-2-chloromethylbenzimidazole for 5-chloro-2-chloromethyl-benzimidazole and propylmercaptan for ethylmercaptan, the product recovered is 2-[(propylsulfonyl) methyl]-5-butylbenzimidazole.

EXAMPLES 8 TO 12

Following the procedure of Example 3 but utilizing the compounds illustrated in Table I, column A, in lieu of 5-chloro - 2 - methylchlorobenzimidazole and the compounds illustrated in Table I. column B, in lieu of ethyl mercaptan, the product formed after oxidation with m-chloroperbenzoic acid possesses the structure of column C.

TABLE I

| Column A<br>(R)$_m$-[benzimidazole]-(CH$_2$)$_n$-C(R$^2$)(R$^{2'}$)-(CH$_2$)$_{n'}$-X<br>R$^1$ on N1 | Column B<br>HS-CH(R$^3$)(R$^4$) | Column C<br>(R)$_m$-[benzimidazole]-(CH$_2$)$_n$-C(R$^2$)(R$^{2'}$)-(CH$_2$)$_{n'}$-S(O)$_2$-CH(R$^3$)(R$^4$) |
|---|---|---|
| Example:<br>8 ...... R=Cl<br>m=2 (5,6)<br>R$^1$=H<br>R$^2$=CH$_3$<br>R$^{2'}$=CH$_3$<br>n=1<br>n'=2<br>X=Br | R$^3$=CH$_3$<br>R$^4$=CH$_3$ | R=Cl<br>m=2 (5,6)<br>R$^1$=H<br>R$^2$=CH$_3$<br>R$^{2'}$=CH$_3$<br>n=1<br>n'=2<br>R$^3$=CH$_3$<br>R$^4$=CH$_3$ |
| 9 ...... R=NH$_2$ (4)<br>m=1<br>R$^1$=benzyl<br>R$^2$=p-chlorophenyl<br>R$^{2'}$=H<br>n=1<br>n'=2<br>X=Cl | R$^3$=H<br>R$^4$=C$_4$H$_9$ | R=NH$_2$ (4)<br>m=1<br>R$^1$=benzyl<br>R$^2$=p-chlorophenyl<br>R$^{2'}$=H<br>n=1<br>n'=2<br>R$^3$=H<br>R$^4$=C$_4$H$_9$ |
| 10 ..... R=C$_4$H$_9$ (5)<br>m=1<br>R$^1$=H<br>R$^2$=H<br>R$^{2'}$=C$_4$H$_9$<br>n=0<br>n'=3<br>X=Cl | R$^3$=H<br>R$^4$=C$_6$H$_5$ | R=C$_4$H$_9$ (5)<br>m=1<br>R$^1$=H<br>R$^2$=H<br>R$^{2'}$=C$_4$H$_9$<br>n=0<br>n'=3<br>R$^3$=H<br>R$^4$=C$_6$H$_5$ |
| 11 ..... R=CH$_3$O<br>m=2 (5,6)<br>R$^1$=H<br>R$^2$=H<br>R$^{2'}$=C$_2$H$_5$<br>n=1<br>n'=1<br>X=Br | R$^3$=C$_6$H$_5$<br>R$^4$=C$_2$H$_5$ | R=CH$_3$O<br>m=2 (5,6)<br>R$^1$=H<br>R$^2$=H<br>R$^{2'}$=C$_2$H$_5$<br>n=1<br>n'=1<br>R$^3$=C$_6$H$_5$<br>R$^4$=C$_2$H$_5$ |
| 12 ..... R=NO$_2$ (5)<br>m=1<br>R$^1$=H<br>R$^2$=H<br>R$^{2'}$=H<br>n=0<br>n'=0<br>X=Cl | R$^3$=p-nitrophenyl<br>R$^4$=p-nitrophenyl | R=NO$_2$ (5)<br>m=1<br>R$^1$=H<br>R$^2$=H<br>R$^{2'}$=H<br>n=0<br>n'=0<br>R$^3$=p-nitrophenyl<br>R$^4$=p-nitrophenyl |
| 13 ..... R=—NHCOO-i-C$_3$H$_7$ (4)<br>m=1<br>R$^1$=C$_6$H$_5$<br>R$^2$=CH$_3$<br>R$^{2'}$=H<br>n=1<br>n'=3<br>X=Br | R$^3$=H<br>R$^4$=—C$_2$H$_5$ | R=—NHCOO-i-C$_3$H$_7$ (4)<br>m=1<br>R$^1$=C$_6$H$_5$<br>R$^2$=CH$_3$<br>R$^{2'}$=H<br>n=1<br>n'=3<br>R$^3$=H<br>R$^4$=C$_2$H$_5$ |

EXAMPLES 14 TO 15

Following the procedure of Example 1, but utilizing the compounds illustrated in Table II column A in lieu of 2-mercaptomethyl-benzimidazole and the compounds illustrated in Table II, column B, in lieu of methyl iodide, the product formed after oxidation possesses the structure of column C.

TABLE II

| Column A<br>(R)$_m$-[benzimidazole]-(CH$_2$)$_n$-C(R$^2$)(R$^{2'}$)-(CH$_2$)$_{n'}$-SH | Column B<br>X-CH(R$^3$)(R$^4$) | Column C<br>(R)$_m$-[benzimidazole]-(CH$_2$)$_n$-C(R$^2$)(R$^{2'}$)-(CH$_2$)$_{n'}$-S(O)$_2$-CH(R$^3$)(R$^4$) |
|---|---|---|
| Example:<br>14 ...... R=NO$_2$ (5)<br>m=1<br>R$^1$=H<br>R$^2$=H<br>R$^{2'}$=CH$_3$<br>n=1<br>n'=1 | X=Br<br>R$^3$=H<br>R$^4$=CH$_2$C$_6$H$_5$ | R=NO$_2$ (5)<br>m=1<br>R$^1$=H<br>R$^2$=H<br>R$^{2'}$=CH$_3$<br>n=1<br>n'=1<br>R$^3$=H<br>R$^4$=CH$_2$C$_6$H$_5$ |
| 15 ...... R=N(CH$_3$)$_2$ (5)<br>m=1<br>R$^1$=H<br>R$^2$=CH$_3$<br>R$^{2'}$=H<br>n=0<br>n'=1 | X=Br<br>R$^3$=H<br>R$^4$=CH(CH$_3$)$_2$ | R=N(CH$_3$)$_2$ (5)<br>m=1<br>R$^1$=H<br>R$^2$=CH$_3$<br>R$^{2'}$=H<br>R$^3$=H<br>R$^4$=CH(CH$_3$)$_2$<br>n=0<br>n'=1 |

What is claimed is:
1. A compound of the structure:

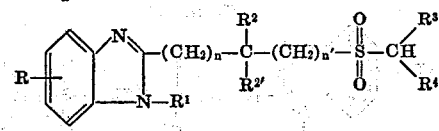

wherein R is selected from the group consisting of —NHCOOR⁵, wherein R⁵ is lower alkyl, and thiocyanato; R¹ is hydrogen, phenyl and lower alkyl; R², R²′, R³ and R⁴ are the same or different and are selected from the group consisting of hydrogen and lower alkyl of from one to seven carbon atoms, $n$ is 0 or 1, $n'$ is 0 to 4 and $n+n'$ is 4 or less, or a physiologically acceptable acid-addition salt thereof.

2. A compound as defined in claim 1 wherein R is 5-isopropoxycarbonylamino, $m$ is 1, R¹, R², R²′, R³ and R⁴ are H, $n$ is 0 and $n'$ is 0.

References Cited

UNITED STATES PATENTS
3,444,175  5/1969  Shen et al. ......... 260—309.2

OTHER REFERENCES
Milner et al.: J. Chem. Soc. (1964), pp. 4151–3.
Barnikow et al.: Chem. Abst., vol. 70, No. 11687a (1969).
Mamedov et al.: Chem. Abst., vol. 61, columns 3092–3 (1964).
Mamedov et al.: Izv. Akad. Nauk SSSR, Ser. Khim. 1964, pp. 698–704.

NATALIE TROUSOF, Primary Examiner

U.S. Cl. X.R.

424—273